(12) United States Patent
Thoms et al.

(10) Patent No.: US 11,872,648 B2
(45) Date of Patent: Jan. 16, 2024

(54) ULTRASONIC WELDING DEVICE WITH DISPLACEABLE STOP ELEMENT

(71) Applicant: SCHUNK SONOSYSTEMS GMBH, Wettenberg (DE)

(72) Inventors: Enno Thoms, Wettenberg (DE); Stefan Müller, Wetzlar (DE); Rainer Wagenbach, Merenberg (DE); Waldemar Werner, Reiskirchen (DE); Daniel Günther, Langgöns (DE); Dariusz Kosecki, Biebertal (DE); Stephan Becker, Marburg (DE); Eugen Koch, Grünberg (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 0 days.

(21) Appl. No.: 17/767,309

(22) PCT Filed: Nov. 5, 2019

(86) PCT No.: PCT/EP2019/080247
§ 371 (c)(1),
(2) Date: Apr. 7, 2022

(87) PCT Pub. No.: WO2021/089123
PCT Pub. Date: May 14, 2021

(65) Prior Publication Data
US 2022/0371118 A1   Nov. 24, 2022

(51) Int. Cl.
*B23K 20/00* (2006.01)
*B23K 20/10* (2006.01)
*B23K 37/04* (2006.01)

(52) U.S. Cl.
CPC ........ *B23K 20/106* (2013.01); *B23K 37/0452* (2013.01)

(58) Field of Classification Search
CPC .... B23K 20/10; B23K 2101/38; B23K 20/26; B23K 31/125; B23K 20/22;
(Continued)

(56) References Cited

U.S. PATENT DOCUMENTS

| | | | |
|---|---|---|---|
| 4,869,419 A | 9/1989 | Nuss | |
| 8,047,420 B2 * | 11/2011 | Stroh | H01R 4/625 228/110.1 |

(Continued)

FOREIGN PATENT DOCUMENTS

| | | |
|---|---|---|
| CN | 104937788 A | 9/2015 |
| CN | 105900297 A | 8/2016 |

(Continued)

OTHER PUBLICATIONS

International Search Report dated Jul. 27, 2020, in corresponding to International Application No. PCT/EP2019/080247; 5 pages (with English Translation).

(Continued)

*Primary Examiner* — Erin B Saad
(74) *Attorney, Agent, or Firm* — Maier & Maier, PLLC

(57) ABSTRACT

An ultrasonic welding device includes a sonotrode, an anvil, a touching element, a lateral slide, a first stop element, a drive device, and a receiving chamber in which joining partners are to be received. The receiving chamber is defined on a first side by a surface of the sonotrode and on a second side opposing the first side by a surface of the anvil. The receiving chamber is further defined on a third side by a surface of the touching element and on a fourth side opposing the third side by a surface of the lateral slide. The first stop element is displaceable between a pulled-in position and a pulled-out position. The first stop element in the pulled-in position defines the receiving chamber on a fifth side extending transverse to the first to fourth sides and in (Continued)

the pulled-out position leaves the receiving chamber open on the fifth side.

13 Claims, 3 Drawing Sheets

(58) Field of Classification Search
CPC ............ B23K 2101/32; B23K 37/0435; B23K 37/0452; B23K 37/047
See application file for complete search history.

(56) References Cited

U.S. PATENT DOCUMENTS

| | | | | |
|---|---|---|---|---|
| 9,419,490 | B2* | 8/2016 | Kajita | H02K 15/0062 |
| 10,357,845 | B2* | 7/2019 | Wagner | H01R 43/0207 |
| 11,165,211 | B2* | 11/2021 | Wagenbach | H01R 43/0207 |
| 11,424,585 | B2* | 8/2022 | Schmidt | H01R 43/0207 |
| 2008/0265004 | A1* | 10/2008 | Stroh | H01R 43/0207 |
| | | | | 228/110.1 |
| 2010/0170935 | A1* | 7/2010 | Stroh | B23K 20/10 |
| | | | | 228/110.1 |
| 2013/0293045 | A1* | 11/2013 | Kajita | B23K 20/10 |
| | | | | 310/71 |
| 2016/0116355 | A1 | 4/2016 | Stroh | |
| 2016/0294140 | A1 | 10/2016 | Trube et al. | |
| 2017/0282289 | A1* | 10/2017 | Wagner | B23K 20/26 |
| 2018/0200827 | A1 | 7/2018 | Strobel et al. | |
| 2019/0030639 | A1* | 1/2019 | Schmidt | H01R 43/0207 |
| 2019/0173251 | A1* | 6/2019 | Wagenbach | H01L 24/78 |
| 2019/0260141 | A1* | 8/2019 | Tamagawa | H01R 4/023 |
| 2019/0344378 | A1* | 11/2019 | Shohara | B23K 20/004 |
| 2020/0091691 | A1* | 3/2020 | Sato | H01R 43/0207 |
| 2020/0227877 | A1 | 7/2020 | Nakamura et al. | |

FOREIGN PATENT DOCUMENTS

| | | | |
|---|---|---|---|
| CN | 105917532 | A | 8/2016 |
| CN | 108352669 | A | 7/2018 |
| DE | 102013222938 | B3 | 4/2015 |
| DE | 102013222939 | B3 | 4/2015 |
| DE | 102015222013 | B3 | 11/2016 |
| EP | 3 572 177 | A1 | 11/2019 |
| JP | 2001025883 | A | 1/2001 |
| JP | 2006015354 | A | 1/2006 |
| JP | 2014127365 | A | 7/2014 |
| JP | 2016524279 | A | 8/2016 |
| JP | 2018534744 | A | 11/2018 |
| WO | 2014103807 | A1 | 7/2014 |
| WO | 2019013331 | A1 | 1/2019 |
| WO | 2019091696 | A1 | 5/2019 |

OTHER PUBLICATIONS

Schunk Sonosystems Gmbh, New concept: Anti-side-splice-kit with one-sided wire-end-stop-sheet, Sep. 29, 2016, 3 pages.
Office Action dated Aug. 1, 2023, in corresponding Japanese Application No. 2022-525799; 10 pages.
Office Action dated Sep. 8, 2023, in corresponding European Application No. 19798614.4; 13 pages.
Office Action dated Sep. 8, 2023, in corresponding Chinese Application No. 201980101709.1; 22 pages.

* cited by examiner

ULTRASONIC WELDING DEVICE WITH DISPLACEABLE STOP ELEMENT

FIELD

The present invention relates to an ultrasonic welding device.

BACKGROUND

For a wide variety of technical applications, it may be necessary to join two components together in a mechanically secure and/or electrically conductive manner. For example, it may be necessary for various purposes to join cables or their strands together mechanically and in an electrically conductive manner. This may be used, for example, to produce wiring harnesses or cable looms with the aid of which electrical consumers, inside a vehicle for example, may be electrically connected to each other, to an energy source and/or to a control system.

So-called ultrasonic welding was developed to produce substance-to-substance bonds between two electrically conductive components, providing them with high strength and good electrical conductivity. It is a special form of friction welding in which components to be welded, also referred to as joining partners or weld deposit, are brought into surface contact with one another and moved against each other under low pressure and high-frequency mechanical vibrations. In this case, the vibrations may be generated with the aid of a sonotrode in which ultrasonic vibrations with frequencies of typically 20 kHz to 50 kHz are generated and transmitted to at least one of the joining partners. Plastic flow then allows the joining partners to permeate or interlock with each other close to the surface without the materials of the joining partners necessarily melting. Ultrasonic welding may therefore be used to bond joining partners together with low impact, quickly and economically.

Ultrasonic welding may in particular also be used for welding metal joining partners, such as strands of two or more cables to be joined, for example, or such as two or more individual wires of a strand of a cable to be welded together, for example. For this purpose, the joining partners are generally inserted into a receiving chamber of an ultrasonic welding device and then welded together between an ultrasonically vibrating sonotrode and an anvil.

In ultrasonic welding, the positioning of the joining partners relative to each other during an ultrasonic welding process may have a significant impact on the quality of the weld produced. In particular, ends of one, two or more strands to be welded as joining partners should be positioned on top of each other as accurately as possible in the receiving chamber of the ultrasonic welding device so that they are received approximately in alignment with each other between the sonotrode and the anvil and may be welded together.

Traditionally, an operator of an ultrasonic welding device often had to take care to correctly position cables to be welded with their strands inside the receiving chamber of the ultrasonic welding device. For this purpose, markings could be provided inside the receiving chamber against which the ends of the strands were to be aligned.

To weld cables together in the form of a so-called end splice, i.e. when both cables were to be inserted into the receiving chamber of the ultrasonic welding device coming from the same direction, it was also known to manually screw a stop element in the form of a so-called strand end stop to a mounting plate and then to mount this mounting plate at a suitable position in the ultrasonic welding device. The strands of the cables could then be positioned in the receiving chamber with their front faces abutting the stop element. However, installing such stop elements was complex and they had to be removed again when not in use.

SUMMARY

There may be a requirement for an ultrasonic welding device for welding two or more joining partners which is easy to operate and/or which may be configured in a simple manner for various purposes, in particular for producing different types of weld splices.

Such a requirement may be met by the subject matter of the independent claim. Advantageous embodiments are defined in the dependent claims and the following description.

According to one aspect of the present invention, an ultrasonic welding device is described which comprises a sonotrode, an anvil, a touching element, a lateral slide, a receiving chamber in which joining partners are to be received, as well as a stop element and a drive device. The stop element is referred to herein as the first stop element since, as explained below, at least one additional stop element may optionally be provided. The receiving chamber is defined on a first side by a surface of the sonotrode and on a second side opposing the first side by a surface of the anvil. The receiving chamber is further defined on a third side by a surface of the touching element and on a fourth side opposing the third side by a surface of the lateral slide. The first stop element is displaceable between a pulled-in position and a pulled-out position. The first stop element in the pulled-in position defines the receiving chamber on a fifth side extending transverse to the first to fourth sides and in the pulled-out position leaves the receiving chamber open on the fifth side. The drive device is configured to actively displace the first stop element between the pulled-in position and the pulled-out position.

Without limiting the scope of the invention in any way, ideas and possible features relating to embodiments of the invention may be considered to be based, inter alia, on the thoughts and findings described below.

The joining partners to be welded are to be received in the receiving chamber of the ultrasonic welding device before and during the welding process. The receiving chamber is typically defined from at least four sides such that the joining partners may only be accommodated in a limited volume. On two opposing sides, i.e. on the top and bottom for example, the receiving chamber may be defined on the one hand by a surface of the sonotrode and on the other hand by a surface of the anvil. The sonotrode and/or the anvil may be displaceable such that these two components may be moved in relation to each other, toward or away from each other, and in this way the receiving chamber may be made smaller or larger in a first direction, i.e. in the vertical direction for example. On two further opposing sides, which extend transverse, preferably perpendicular, to the previously mentioned two sides, i.e. on the left and right for example, the receiving chamber may be defined on the one hand by a surface of the touching element and on the other hand by a surface of the lateral slide. The touching element and/or the lateral slide may again be displaceable such that these two components may be moved in relation to each other, toward or away from each other, and in this way the receiving chamber may be made smaller or larger in a second direction extending perpendicular to the above-mentioned first direction. In this case, the surfaces of said components may surround the receiving chamber like a frame, in particular a quadrangular frame. On the fifth or sixth side which is not defined by said components, the joining partners may be inserted or pushed into the receiving chamber surrounded in a frame-like manner.

The formulation "defining the receiving chamber on one side" may be understood to the effect that the respective surface of the component mentioned in each case results in the joining partners being unable to move beyond the boundary produced by this surface. For this purpose, the respective surface may completely cover the receiving chamber on the respective side. Alternatively, however, only partial covering of the receiving chamber on the respective side may also be sufficient, as long as it remains ensured that the joining partners are held within the receiving chamber.

The two respectively opposing components, i.e. the sonotrode and the anvil or the touching element and the lateral slide, may preferably be moved relative to each other, in particular toward each other, in such a manner as to be able to temporarily reduce a volume of the receiving chamber and, in particular, to be able to press the joining partners received therein into contact with each other.

By providing the joining partners with only a relatively small receiving chamber, which is surrounded in a frame-like manner by the mentioned four components transverse to a direction in which the mostly elongate joining partners are pushed or inserted into the receiving chamber, it may be achieved that the joining partners may or must already be arranged in the receiving chamber with predetermined positioning in relation to each other before the actual welding operation begins, i.e. before the joining partners are pressed together between the sonotrode and the anvil. For example, it may be achieved that strands of two cables serving as joining partners and stripped at their ends are arranged in the receiving chamber in such a manner that they are pressed tightly into contact with each other when the sonotrode and the anvil are brought toward each other. If the sonotrode and the anvil define the receiving volume from above and below, this means that the two cable ends are advantageously arranged vertically on top of each other. Such an arrangement typically has a positive effect on a welding result, whereas strands arranged side by side would frequently be welded only insufficiently.

In contrast to conventional ultrasonic welding devices, the ultrasonic welding device described here is to have a first stop element, with the aid of which a fifth side of the receiving chamber may also be defined. This fifth side extends transverse, preferably perpendicular, to the other four sides described above, which are defined in a frame-like manner by other components. On the fifth side, the first stop element may thus define or close a passage through the receiving chamber, which is defined in a frame-like manner, such as would otherwise occur between the fifth and the opposing sixth side.

Accordingly, although one or more joining partners may be inserted into the receiving chamber on the sixth side, they may no longer leave the receiving chamber on the fifth side or protrude beyond the receiving chamber on the fifth side. Instead, the front face of elongate joining partners may merely reach up to a surface of the stop element directed toward the receiving chamber and come into contact therewith.

Thus, one or more joining partners to be welded may each be inserted into the receiving chamber and pushed with their front face up to the stop element such that their front face ends are aligned abutting the stop element or such that, in the case of a plurality of joining partners, their front face ends are positioned on top of and in alignment with each other and/or side by side. The joining partners may be inserted by a user operating the ultrasonic welding device or by another machine.

Provision of the stop element on the fifth side of the receiving chamber makes it very easy to insert the joining partners into the receiving chamber in a configuration in which they are aligned relative to each other. For example, a person may push cables coming from the sixth side into the receiving chamber until they feel that the cables are abutting the stop element arranged opposite. Accordingly, there is at least in some cases no need to visually check the positioning of the cables.

However, it was realized that the stop element defining the fifth side may be obstructive or undesirable in certain cases. For example, it may be desirable to be able to use the ultrasonic welding device also for welding so-called inline splices. The cables welded together in a configuration as an inline splice form an extension of an electric wire, whereas the configuration as an end splice may be considered as a kind of return of the electric wire. To create an inline splice by ultrasonic welding, cables are inserted into the receiving chamber from opposing sides. Accordingly, the mutually opposing fifth and sixth sides of the receiving chamber should at least not permanently be defined by a stop element for this application purpose.

It is therefore proposed to provide the first stop element as an integrated component of the ultrasonic welding device, i.e. the first stop element is permanently connected to and interacts with other components of the ultrasonic welding device. However, the first stop element should not be fixed in a stationary position in the ultrasonic welding device but rather it is proposed to configure the first stop element in such a displaceable manner that it may be moved between a first, so-called pulled-in position and a second, so-called pulled-out position. In the pulled-in position, the first stop element defines the receiving chamber on its fifth side. Accordingly, in this configuration it may serve as a mechanical stop for one or more joining partners which are inserted into the receiving chamber from the sixth side. In the pulled-out position, however, the stop element uncovers the fifth side at least to such an extent that one or more joining partners may also be inserted into the receiving chamber from the fifth side. Expressed differently, the stop element of the ultrasonic welding device described herein may be selectively pulled in or pulled out depending, for example, on whether an end splice or an inline splice is to be welded. The pulled-in position and the pulled-out position may be several millimeters to a few centimeters, for example between 2 mm and 10 cm, preferably between 4 mm and 4 cm, apart from each other.

The ultrasonic welding device further comprises the drive device, which is configured to actively displace the first stop element between the pulled-in position and the pulled-out position.

In other words, the ultrasonic welding device is not to have a first stop element which is to be moved merely passively and which, for example, is displaced between the pulled-in and the pulled-out position by a person operating the ultrasonic welding device. Instead, the ultrasonic welding device is to have a drive device which may actively displace the first stop element from the pulled-in position to the pulled-out position and/or vice versa. Displacement of the first stop element may be automated by means of such a drive device. The drive device may be connected to a power supply. Furthermore, the drive device may be connected to a control system or have an integrated control system with which its operation may be controlled.

In particular, the drive device may be configured, according to a detailed embodiment, to displace the stop element by means of an electric motor, by means of a hydraulic system or by means of a pneumatic system.

For example, an electric motor may be coupled to the stop element directly, via a transmission or via another mechanism in order to be able to move the stop element to and fro between the pulled-in position and the pulled-out position by correspondingly directed operation of the electric motor. The electric motor may be fed by an electric power supply. The power supply may be controlled as necessary.

Alternatively, the stop element may be coupled to components of a hydraulic system or pneumatic system which are to be moved and may be moved between the pulled-in position and the pulled-out position by these components. The hydraulic system or pneumatic system may be connected to a pressure reservoir or a pressure generator and may thereby be supplied with fluid or gas under pressure, wherein a supply may optionally be controlled as necessary by opening and closing valves, for example.

According to a further detailed embodiment, the drive device is configured to displace the first stop element linearly between the pulled-in position and the pulled-out position.

Expressed differently, the drive device may be capable of displacing the first stop element from the pulled-in position into the pulled-out position and/or vice versa along a straight travel path. Such a linearly acting drive device may be implemented in a technically simple manner and/or occupy a small installation space. In addition, the first stop element may be displaced between its two extreme positions over the shortest path. There may be used as the drive device, for example, an electric linear drive, a rotating electric motor, in which a rotation is converted into a linear movement by means of a transmission for example, a hydraulically or pneumatically moved piston or the like.

According to an alternative detailed embodiment, the drive device is configured to pivot the first stop element between the pulled-in position and the pulled-out position.

In other words, the drive device may be configured to displace the first stop element between the pulled-in position and the pulled-out position along a curved travel path. For this purpose, the drive device, for example by means of an electric motor, a hydraulic system or a pneumatic system, may effect a rotary movement which pivots the first stop element coupled to the drive device into the pulled-in position or out of the pulled-in position.

According to one embodiment, the ultrasonic welding device may further comprise a joining partner detection device which is adapted to detect the presence of a joining partner in the receiving chamber and then to generate a detection signal. The drive device may be configured to displace the stop element between the pulled-in position and the pulled-out position in an automated manner in dependence on the detection signal.

The joining partner detection device may be configured with a sensor system, for example, which, by suitably monitoring specific physical parameters, makes it possible to detect whether one or more joining partners are currently in the receiving chamber. The sensor system may monitor optical, magnetic, electrical, mechanical or other parameters, for example. The sensor system may possibly even be configured to detect the position of a joining partner inside the receiving chamber and/or the direction in which the joining partner is being moved inside the receiving chamber.

On the basis of one or more such pieces of information, the joining partner detection device may then generate a detection signal. A control system controlling the operation of the drive device may receive this detection signal and suitably activate the drive device in response thereto. The control system may be part of the drive device. Alternatively, the drive device may be configured to be controlled by an external control system.

The possibility of detecting the presence of a joining partner in the receiving chamber by means of the joining partner detection device allows the drive device to displace the stop element into a desired position in a fully automated or partially automated manner.

For example, if it is detected at the beginning that a joining partner has been inserted into the receiving chamber from the sixth side, the first stop element may first be brought into its pulled-in position so that the joining partner may be aligned mechanically abutting the first stop element. As soon as this has taken place, the first stop element may optionally be displaced back into the pulled-out position, optionally in an automated manner, in order to allow one or more further joining partners to be inserted into the receiving chamber from the opposing fifth side. In this manner, the joining partner(s) introduced first may finally be welded to the joining partner(s) introduced subsequently to form an inline splice.

According to one embodiment, the ultrasonic welding device may further comprise a human-machine interface which is adapted to generate request data on the basis of an input by a user. The drive device may be configured to displace the first stop element between the pulled-in position and the pulled-out position in an automated manner in dependence on the request data.

The human-machine interface may be, for example, a keyboard, a touch-sensitive screen, a microphone with downstream speech recognition or the like. Via the human-machine interface, a user operating the ultrasonic welding device may input data which may represent, for example, information about the joining partners to be welded and/or the weld splice to be produced. For example, it is possible to input that two joining partners are to be welded to form an inline splice. On the basis of the input, the human-machine interface may generate request data and transmit them to a control system, for example. The control system may then control the operation of the drive device in a fully automated or partially automated manner in order to move the first stop element into a desired position.

If, for example, it is known that an inline splice is to be welded, the first stop element may first be displaced into the pulled-in position so that the first joining partner may be correctly positioned abutting thereon. The first stop element may then automatically be displaced into the pulled-out position so that the second joining partner may be inserted into the receiving chamber from the opposing side.

According to one embodiment, the ultrasonic welding device may further comprise a sensor system which is configured to detect that the first stop element has reached the pulled-in position and then to generate a pulled-in signal and/or to detect that the first stop element has reached the pulled-out position and then to generate a pulled-out signal.

Expressed differently, a sensor system may be provided by means of which the actual position of the first stop element may be detected. When the stop element has actually reached the pulled-in position, a specific pulled-in signal is generated by the sensor system. When the stop element has actually reached the pulled-out position, a specific pulled-out signal is generated by the sensor system.

On the basis of these specific signals it is possible to detect, independently of control signals with which, for example, a control system activates the drive device to move the first stop element to a specific position, whether the first stop element actually reaches the activated position. Any malfunctions in the activation of the drive device and/or in the resulting displacement of the stop element may thereby be detected.

According to one embodiment, the ultrasonic welding device may further comprise a guide for guiding the first stop element during a displacement movement between the pulled-in position and the pulled-out position.

The guide may guide the first stop element during its displacement movement in such a manner that it may be moved in a largely force-free manner along a desired displacement path, i.e. along the shortest path between the pulled-out position and the pulled-in position for example, but is supported transverse to the displacement path and thus cannot leave the displacement path without the action of undue force. The guide may help to prevent the stop element and/or the drive device coupled thereto from being damaged, for example if incorrectly handled by the user and/or as a result of joining partners being pressed with excessive force against the stop element.

According to an embodiment that may be implemented particularly easily, the first stop element may define the receiving chamber with a single plate.

Expressed differently, the first stop element may be configured in one piece and in a planar manner as a plate. The dimensions and/or material of the plate may be chosen in such a manner that on the one hand the plate is sufficiently stable to withstand the forces that occur during the alignment of joining partners at the first stop element, but on the other hand the plate remains sufficiently lightweight that it may easily be displaced.

According to a further developed embodiment, the ultrasonic welding device may further comprise a second stop element. The second stop element may be displaceable between a pulled-in position and a pulled-out position. The second stop element in the pulled-in position is to define the receiving chamber at least in some regions on a sixth side extending transverse to the first to fourth sides and opposing the fifth side and in the pulled-out position is to leave the receiving chamber open on the sixth side.

The second stop element may thus be arranged on the opposite side to the first stop element so that the two stop elements define the receiving chamber between them. In this case, the first stop element may be used to position joining partners inserted into the receiving chamber from the sixth side such that they abut on the first stop element and thus reach directly to the edge of the receiving chamber there but do not protrude beyond it. In contrast, the second stop element may be used to perform a similar task for joining partners inserted from the opposing fifth side, i.e. to position them by laying their front faces against the second stop element in such a manner that they reach up to the opposing edge of the receiving chamber but do not protrude beyond it. By means of the two stop elements, joining partners may thus be received in the receiving chamber one after the other from both opposing sides and be suitably positioned therein in order to form a high-quality inline splice after the ultrasonic welding process.

The second stop element, similarly to the first stop element, is to be displaceable between a pulled-in position and a pulled-out position. Accordingly, while the first stop element is arranged in its pulled-in position, the second stop element may be displaced into its pulled-out position such that the sixth side of the receiving chamber is open and one or more joining partners may be pushed into the receiving chamber from that side until they abut on the first stop element. Then the first stop element may be displaced into its pulled-out position and the second stop element may be brought into its pulled-in position. In this configuration, the fifth side of the receiving chamber is then open such that one or more joining partners may be pushed into the receiving chamber from that side until they abut on the second stop element. The first and second stop elements may be displaced independently of each other or in dependence on each other. They may further be displaced in a fully or partially automated manner.

According to a detailed embodiment, in this case the second stop element may comprise a plurality of elongate segments which each extend in a direction along the sixth side and parallel to each other. Each of the segments may be displaceable between the pulled-in position and the pulled-out position independently of adjacent segments.

In other words, the second stop element may preferably be in multi-part form. A boundary of the receiving chamber formed on its sixth side by the second stop element may be composed in this case of a plurality of segments. Each individual segment may be elongate and extend along or in extension of the sixth side or parallel thereto. In this case, the various segments may extend parallel to each other and thus, when they are displaced into their pulled-in positions, may cover at least certain regions of the sixth side of the receiving chamber with their surfaces.

The segments may be displaced between the pulled-in position and the pulled-out position independently of each other. Expressed differently, each of the segments may be displaced in the direction of its longitudinal extension independently of adjacent segments. Accordingly, some of the segments may remain in their pulled-out position, for example, while others of the segments are displaced into their pulled-in position or into an intermediate position.

This segment-like structure of the second stop element may have the effect that the boundary to be implemented thereby on the sixth side of the receiving chamber may, if necessary, cover not the entire sixth side but only parts thereof. This may be advantageous if, for example, joining partners coming from the sixth side have previously been positioned in the receiving chamber such that the receiving chamber may no longer be completely closed on its sixth side. In this case, those segments which would cover a partial region of the sixth side, from which the joining partners already inserted extend outward, may remain in their pulled-out position, whereas the other segments may cover an adjacent partial region of the sixth side by being displaced into their pulled-in position. The segments displaced into the pulled-in position may then form a physical stop for joining partners inserted from the opposing fifth side.

According to a further detailed embodiment, in the case of such a second stop element of segment-like structure, at least some of the segments may each be elastically held on a respective associated segment-moving element so that, when they are force-actuated toward the pulled-in position, they are elastically biased toward the pulled-in position.

In other words, each of the segments of the second stop element may be moved by an associated segment-moving element toward the pulled-in position and back to the pulled-out position. However, the segment is not rigidly coupled to the segment-moving element but is elastically held thereon. When the segment-moving element is moved in the direction of the pulled-in position, it carries the segment with it unhindered toward the pulled-in position, as long as no counterforce acts on the segment. In this case, the segment is elastically biased toward the pulled-in position. This means that, when a counterforce acts on the segment in the direction toward the pulled-out position, the segment may be displaced against this elastic bias toward the pulled-out position. Also in the case where the segment-moving element is moved toward the pulled-in position but the segment elastically coupled thereto encounters, on the path to the pulled-in position, an obstacle which exerts a force on the segment in the opposite direction, the segment-moving element may be moved further in the direction toward the pulled-in position but the segment, despite gradually increasing elastic bias, may remain in its original position.

In such an embodiment, an attempt may be made to displace the second stop element, for example, with all its segments toward the pulled-in position. For this purpose, all the segment-moving elements may be displaced in the direction toward the pulled-in position. However, only those segments of the second stop element that do not encounter an obstacle on the path to the pulled-in position are actually displaced to the pulled-in position. Such an obstacle may be formed in particular by joining partners previously already arranged in the receiving chamber. As a result, the second stop element may adapt almost automatically to the loading with joining partners previously effected in the receiving chamber in that only those segments which are not blocked by joining partners extending out of the receiving chamber on the sixth side are actually displaced into the pulled-in position.

According to one embodiment, the ultrasonic welding device may further comprise a drive device for driving the second stop element, a further joining partner detection device for detecting joining partners in the receiving chamber close to the second stop element, a sensor system for detecting a current position of the second stop element, and/or a guide for guiding a displacement movement of the second stop element.

The mentioned devices and components may be configured analogously to the description given above in connection with the first stop element.

It should be noted that possible features and advantages of embodiments of the invention are explained herein partly with reference to an ultrasonic welding device configured according to the invention and partly with reference to a manner of operating or using the same. A person skilled in the art will recognize that the features described for individual embodiments may be suitably transferred to other embodiments in an analogous manner, may be adapted and/or interchanged to arrive at further embodiments of the invention and possibly synergistic effects.

BRIEF DESCRIPTION OF THE DRAWINGS

Advantageous embodiments of the invention are further explained below with reference to the accompanying drawings, and neither the drawings nor the explanations are to be construed as limiting the invention in any way.

The figures are merely schematic and not to scale. Identical reference numerals in the various drawings denote identical features or features having the same effect.

DETAILED DESCRIPTION

Figure 1:
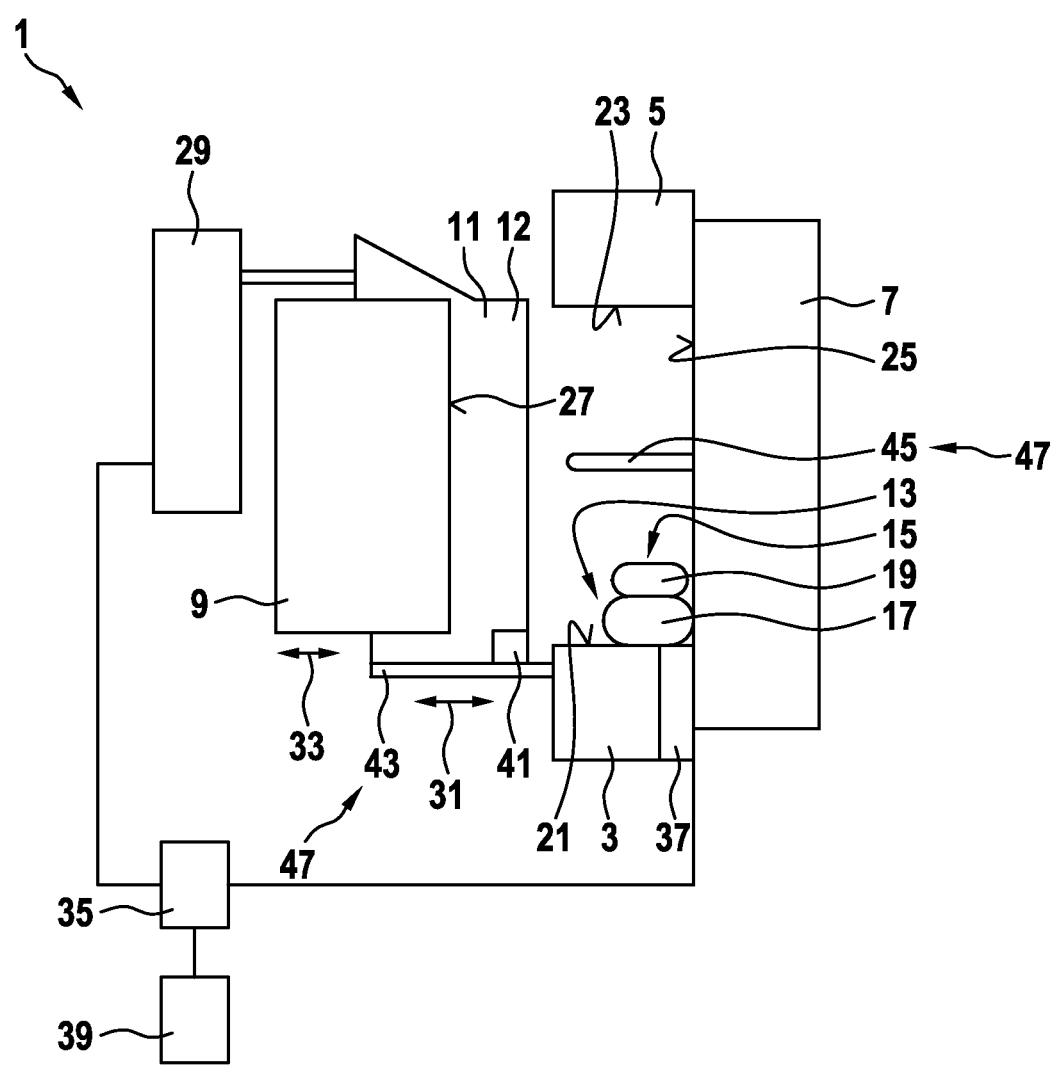
FIG. 1 shows a greatly simplified lateral view of an ultrasonic welding device according to an embodiment of the present invention.

FIG. 1 shows, in a greatly simplified manner, an ultrasonic welding device 1 according to an embodiment of the present invention. The ultrasonic welding device 1 is also shown in FIG. 2 and FIG. 3 in a specific embodiment in a perspective view and with somewhat more detail regarding some main components.

The ultrasonic welding device 1 comprises a sonotrode 3, an anvil 5, a touching element 7 and a lateral slide 9. Said components surround in a frame-like manner a receiving chamber 13 in which joining partners 15, such as a first strand 17 of a first cable and a second strand 19 of a second cable, may be received. A first side (at the bottom in the example shown) of the receiving chamber 13 is defined in this case by a surface 21 of the sonotrode 3. A second side (at the top in the example shown) opposing the first side of the working chamber 13 is defined by a surface 23 of the anvil 5. A third side (on the right in the example shown) of the receiving chamber 13 is defined by a surface 25 of the touching element 7. And a fourth side (on the left in the example shown) opposing the third side of the receiving chamber 13 is defined by a surface 27 of the lateral slide 9. In the example shown, the surfaces 21 and 23 of the sonotrode 3 and the anvil 5 each extend horizontally and parallel to each other, whereas the surfaces 25 and 27 of the touching element 7 and the lateral slide 9 each extend vertically and again parallel to each other. The receiving chamber 13 defined by said surfaces 21, 23, 25, 27 is thus approximately cuboid.

Figure 2:
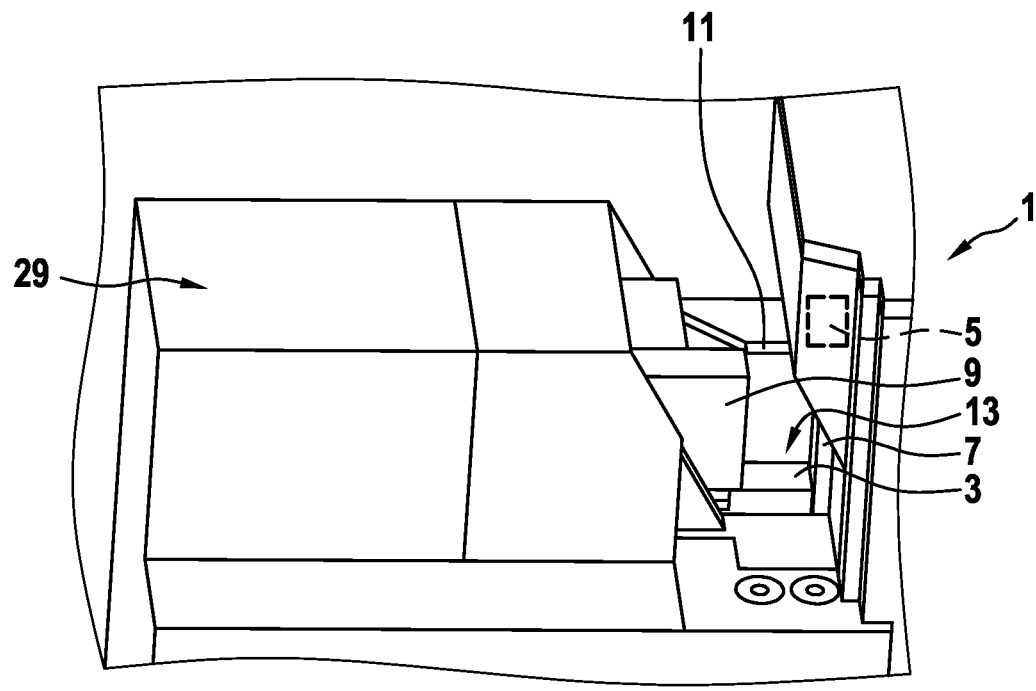
FIG. 2 shows a perspective view of an ultrasonic welding device according to an embodiment of the present invention with a first stop element in its pulled-in position.
Figure 3:
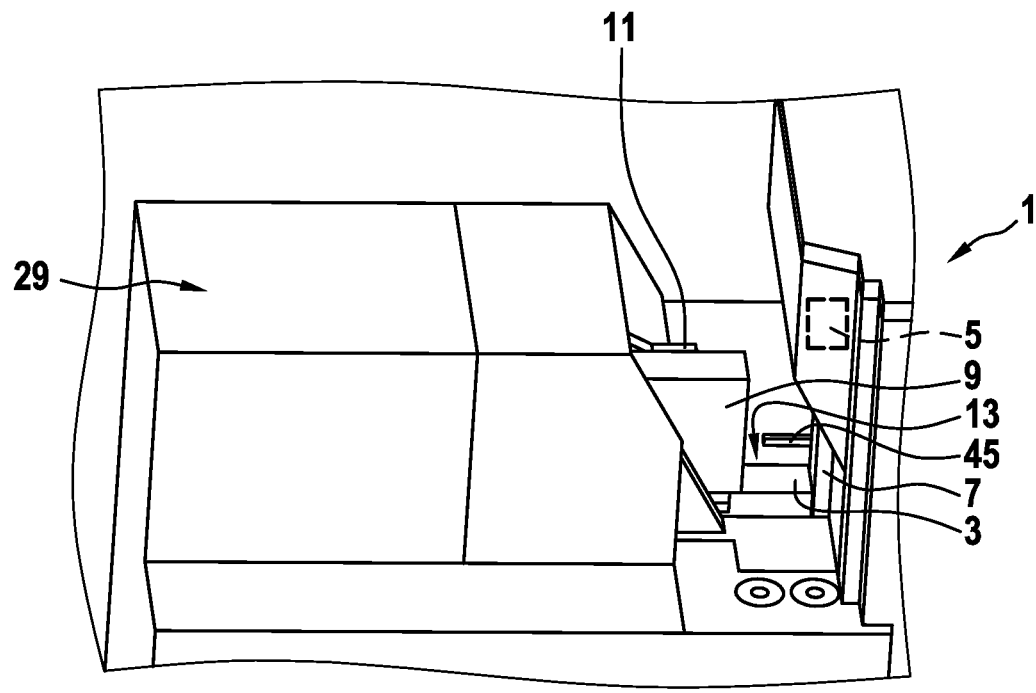
FIG. 3 shows a perspective view of an ultrasonic welding device according to an embodiment of the present invention with a first stop element in its pulled-out position.

As may easily be seen in the perspective views of FIGS. 2 and 3, a first stop element 11 is provided behind the lateral slide 9. This first stop element 11 may be arranged as shown in FIG. 2 in a pulled-in position in which it defines the receiving chamber 13 on a fifth side (at the back in the example shown). If necessary, the first stop element 11 may be displaced, as shown in FIG. 3, into a pulled-out position in which it leaves the receiving chamber 13 open on the fifth side.

For reasons of clarity, FIGS. 2 and 3 show only a few of the main components of the ultrasonic welding device but some of the optional components explained below are only schematically illustrated in FIG. 1 and are omitted in FIGS. 2 and 3.

The first stop element 11 may be displaced along a displacement direction 31 between the pulled-in position and the pulled-out position by means of a drive device 29. For this purpose, the drive device 29 may be controlled by a control system 35. The control system 35 may be a separate component or may integrated in the drive device 29.

The control system 35 may communicate, for example, with a joining partner detection device 37 and receive a detection signal therefrom as soon as the presence of one or more joining partners 15 in the receiving chamber 13 has been detected. The control system 35 may then, in an automated manner, activate the drive device 29 to displace the first stop element 11 into its pulled-in position. Accordingly, the joining partners 15 inserted into the receiving chamber 13 on the sixth side may then be guided with their front face up to the first stop element 11 and thus be aligned approximately with the edge of the sonotrode 3 on the fifth side of the receiving chamber 13.

Additionally or alternatively, the control system 35 may communicate with a human-machine interface 39 via which inputs may be inputted by an operator. These inputs may indicate, for example, which type of contact splice is to be produced, what properties the joining partners 15 to be welded have, etc. On the basis of these inputs, request data may be transmitted to the control system 35, which may then, in an automated manner, activate the drive device to displace the first stop element 11 to a suitable position, i.e. in particular to the pulled-in or the pulled-out position.

The ultrasonic welding device 1 optionally further comprises a sensor system 41 by means of which it may be detected when the first stop element 11 actually reaches its pulled-in position or its pulled-out position. The sensor system 41 may then generate a pulled-in signal or a pulled-out signal, respectively. These signals may in turn be forwarded to the control system 35, which thus receives feedback about a current actual position of the first stop element 11. The signals may thus be used, for example, to control operation of the drive device 29.

In order to prevent the first stop element 11 from leaving a desired displacement path as it is displaced between the pulled-out and the pulled-in position, a guide 47 is further provided. In the example shown, the guide 47 is configured with a guide rail 43, which guides a lower edge of the first stop element 11, which in the example is in the form of a one-piece plate.

Independently of a movement of the first stop element 11, the lateral slide 9 may also be displaced in a displacement direction 33 in order to be able to make the receiving chamber 13 smaller after the joining partners 15 have been inserted and thus hold the joining partners 15 in a desired position.

Figure 4:
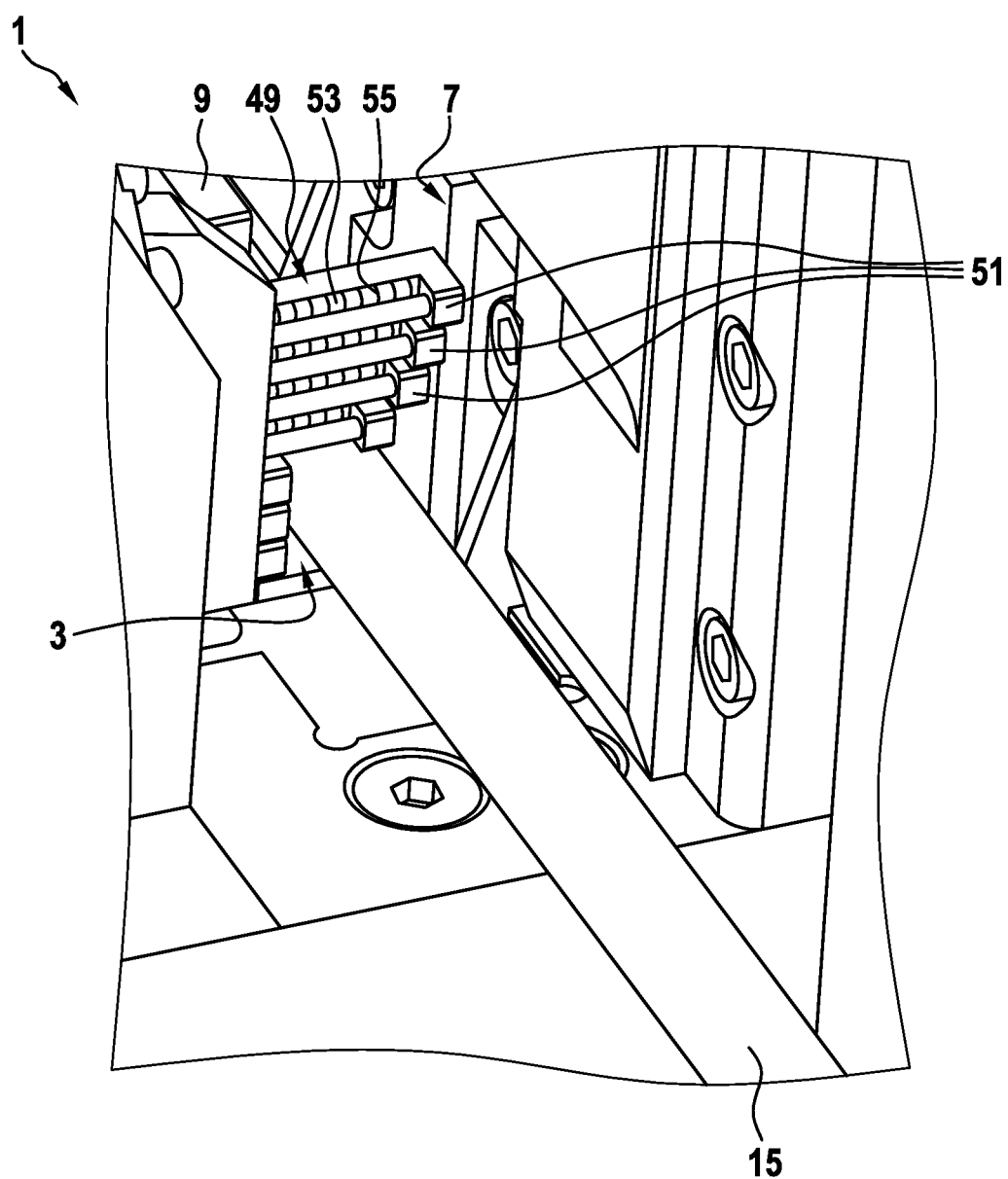
FIG. 4 shows a perspective view of an ultrasonic welding device according to an embodiment of the present invention with an additional second stop element in its pulled-in position at least in certain regions.

FIG. 4 illustrates a configuration of the ultrasonic welding device 1 in which a second stop element 49 has been displaced into its pulled-in position at least in certain regions. The second stop element 49 extends adjacent to the receiving chamber 13 on the sixth side opposing the fifth side. Thus, the second stop element 49 may serve as a mechanical stop for joining partners 15 which have been inserted into the receiving chamber 13 from the fifth side.

The second stop element 49 is not configured as a simple one-piece plate like the first stop element 11 but has a plurality of elongate segments 51. The segments 51 may be displaced into the pulled-in and/or the pulled-out position independently of each other. For this purpose, each of the segments 51 is coupled to a segment-moving element 53 which may be displaced by a drive device (not shown). However, the segment-moving element 53 does not transmit a movement of the drive device rigidly to the associated segment 51. Instead, the segment 51 is coupled to the segment-moving element 53 via a spring 55. In this way, it may be achieved that the respective segment 51, when it is force-actuated by its segment-moving element 53 toward the pulled-in position, is elastically biased toward the pulled-in position but in fact does not necessarily move toward the pulled-in position. Instead, segments 51 which encounter an obstacle, such as joining partners 15 arranged in the receiving chamber 13, during a movement toward the pulled-in position may be stopped by this obstacle. These segments 51 then press against the obstacle in an elastically biased manner. This may be used to temporarily secure joining partners 15 already arranged in the receiving chamber 13. This is illustrated in FIG. 4 for the lower three segments 51.

Those segments 51 which do not encounter an obstacle are displaced toward the pulled-in position. There they then form a boundary of the receiving chamber 13, on which joining partners inserted from the opposite side may abut mechanically and thus be aligned. This is illustrated in FIG. 4 for the upper four segments 51.

Summarized with partially different wording, the first and/or the second stop element 11, 49 are integrated in the ultrasonic welding device 1 and, according to the splice parameters, may be pulled in and pulled out (for example electrically or pneumatically) automatically, for example by a drive controlled with the aid of software. This is possible both for end splices and for inline splices, provided that two stop elements 11, 49 are provided for the latter case. The second stop element 49 preferably consists of a plurality of spring-loaded displaceable segments which are pulled out completely only at those locations which are not occupied by joining partners 15 already inserted previously. Thus, only a stop for the joining partners 15 to be inserted from an opposite side (from the left) is formed.

With embodiments of the ultrasonic welding device 1 proposed herein, stoppage times, which are traditionally necessary for installing or removing a separate stop for example, may be reduced and/or a consistent weld quality may be achieved. In addition, the ultrasonic welding device 1 may optionally be used with a respective stop both for forming end splices and for forming inline splices. Fluctuating qualities in the end product produced, as may traditionally occur as a result of inexact insertion positions relating to the joining partners inserted in the receiving chamber, may largely be avoided with the proposed ultrasonic welding device 1.

Finally, it should be noted that terms such as "having", "comprising", etc. do not exclude any other elements or steps and the term "one" does not exclude a plurality. It should further be pointed out that features or steps which have been described with reference to one of the above exemplary embodiments may also be used in combination with other features or steps of other exemplary embodiments described above. Reference numerals in the claims are not to be regarded as a limitation.

LIST OF REFERENCE NUMERALS

1 Ultrasonic welding device
3 Sonotrode
5 Anvil
7 Touching element
9 Lateral slide
11 First stop element
12 Plate
13 Receiving chamber
15 Joining partner
17 First strand
19 Second strand
21 Surface of the sonotrode
23 Surface of the anvil
25 Surface of the touching element
27 Surface of the lateral slide
29 Drive device
31 Displacement direction of the first stop element
33 Displacement direction of the lateral slide
35 Control system
37 Joining partner detection device
39 Human-machine interface
41 Sensor system
43 Guide rail 47 Guide
49 Second stop element
51 Segments
53 Segment-moving element
55 Springs

The invention claimed is:

1. An ultrasonic welding device, comprising:
a sonotrode;
an anvil;
a touching element;
a lateral slide;
a first stop element;
a drive device; and
a receiving chamber in which joining partners are to be received;
wherein the receiving chamber is defined on a first side by a surface of the sonotrode and on a second side opposing the first side by a surface of the anvil;
wherein the receiving chamber is further defined on a third side by a surface of the touching element and on a fourth side opposing the third side by a surface of the lateral slide;
wherein the first stop element is displaceable between a pulled-in position and a pulled-out position;
wherein the first stop element in the pulled-in position defines the receiving chamber on a fifth side extending transverse to the first to fourth sides and in the pulled-out position leaves the receiving chamber open on the fifth side; and
wherein the drive device is configured to actively displace the first stop element between the pulled-in position and the pulled-out position.

2. The ultrasonic welding device according to claim 1, wherein the drive device is configured to displace the first stop element by means of an electric motor, by means of a hydraulic system or by means of a pneumatic system.

3. The ultrasonic welding device according to claim 1, wherein the drive device is configured to displace the first stop element linearly between the pulled-in position and the pulled-out position.

4. The ultrasonic welding device according to claim 1, wherein the drive device is configured to pivot the first stop element between the pulled-in position and the pulled-out position.

5. The ultrasonic welding device according to claim 1, further comprising
a joining partner detection device which is adapted to detect the presence of a joining partner in the receiving chamber and then to generate a detection signal,
wherein the drive device is configured to displace the first stop element between the pulled-in position and the pulled-out position in an automated manner in dependence on the detection signal.

6. The ultrasonic welding device according to claim 1, further comprising a human-machine interface which is adapted to generate request data on the basis of an input by a user,
wherein the drive device is configured to displace the first stop element between the pulled-in position and the pulled-out position in an automated manner in dependence on the request data.

7. The ultrasonic welding device according to claim 1, further comprising a sensor system which is configured to detect that the first stop element has reached the pulled-in position and then to generate a pulled-in signal and/or to detect that the first stop element has reached the pulled-out position and then to generate a pulled-out signal.

8. The ultrasonic welding device according to claim 1, further comprising a guide for guiding the first stop element during a displacement movement between the pulled-in position and the pulled-out position.

9. The ultrasonic welding device according to claim 1, wherein the first stop element defines the receiving chamber with a single plate.

10. The ultrasonic welding device according to claim 1, further comprising a second stop element, wherein the second stop element is displaceable between a pulled-in position and a pulled-out position, wherein the second stop element in the pulled-in position defines the receiving chamber at least in some regions on a sixth side extending transverse to the first to fourth sides and opposing the fifth side and in the pulled-out position leaves the receiving chamber open on the sixth side.

11. The ultrasonic welding device according to claim 10, wherein the second stop element comprises a plurality of elongate segments which each extend in a direction along the sixth side and parallel to each other,
wherein each of the segments is displaceable between the pulled-in position and the pulled-out position independently of adjacent segments.

12. The ultrasonic welding device according to claim 11, wherein at least some of the segments are each elastically held on a respective associated segment-moving element so that, when they are force-actuated toward the pulled-in position, they are elastically biased toward the pulled-in position.

13. The ultrasonic welding device according to claim 10, further comprising a drive device for driving the second stop element, a joining partner detection device for detecting joining partners in the receiving chamber close to the second stop element, a sensor system for detecting a current position of the second stop element, and/or a guide for guiding a displacement movement of the second stop element.

* * * * *